(12) United States Patent
Watanabe et al.

(10) Patent No.: US 11,346,461 B2
(45) Date of Patent: May 31, 2022

(54) MANUAL VALVE DEVICE AND FLUID CONTROL DEVICE

(71) Applicant: FUJIKIN INCORPORATED, Osaka (JP)

(72) Inventors: Kazunari Watanabe, Osaka (JP); Tomohiro Nakata, Osaka (JP); Toshiyuki Inada, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 123 days.

(21) Appl. No.: 16/649,847

(22) PCT Filed: Sep. 4, 2018

(86) PCT No.: PCT/JP2018/032708
§ 371 (c)(1),
(2) Date: Mar. 23, 2020

(87) PCT Pub. No.: WO2019/065117
PCT Pub. Date: Apr. 4, 2019

(65) Prior Publication Data
US 2020/0278046 A1   Sep. 3, 2020

(30) Foreign Application Priority Data

Sep. 29, 2017 (JP) ............... JP2017-189432
Sep. 29, 2017 (JP) ............... JP2017-189554

(51) Int. Cl.
*F16K 31/524* (2006.01)
*F16K 35/02* (2006.01)

(52) U.S. Cl.
CPC ...... *F16K 31/52408* (2013.01); *F16K 35/027* (2013.01)

(58) Field of Classification Search
None
See application file for complete search history.

(56) References Cited

FOREIGN PATENT DOCUMENTS

| CN | 106051187 A | 10/2016 |
|----|-------------|---------|
| DE | 616251 C | 7/1935 |

(Continued)

OTHER PUBLICATIONS

FR1580379A, Espacenet Machine Translation, 1968 (Year: 1968).*

(Continued)

*Primary Examiner* — Daphne M Barry
(74) *Attorney, Agent, or Firm* — Greenblum & Bernstein, P.L.C.

(57) ABSTRACT

To provide a manual valve device suitable for a miniaturized and integrated fluid control system, the manual valve device includes a casing having a tubular shape and incorporating a drive mechanism, an operation member for activating the drive mechanism, and a cam part that converts a force acting on the operation member into a driving force of the drive mechanism. The manual valve device further includes a protective cover provided on an upper end side of the casing and covering at least a portion of the operation member. The operation member includes an attaching part that allows removable attaching of an auxiliary tool for causing a force required for activation of the drive mechanism to act on the operation member. The protective cover is formed so as to allow access to the attaching part of the operation member by the auxiliary tool.

13 Claims, 22 Drawing Sheets

(56) References Cited

FOREIGN PATENT DOCUMENTS

| | | |
|---|---|---|
| FR | 1580379 A | 9/1969 |
| JP | S61-123865 U | 9/1986 |
| JP | H3-80163 U | 8/1991 |
| JP | H08-42742 A | 2/1996 |
| JP | H11-311365 A | 11/1999 |
| JP | 2001-146977 A | 5/2001 |
| JP | 2002-206700 A | 7/2002 |
| JP | 2004-169810 A | 6/2004 |
| JP | 2009-68664 A | 4/2009 |

OTHER PUBLICATIONS

JPH0842742A, Espacenet Machine Translation, 1996 (Year: 1996).*
JP2004169810A, PE2E Search Machine Translation, 2004 (Year: 2004).*
International Search Report issued in International Patent Application No. PCT/JP2018/032708, dated Nov. 20, 2018, English translation.
International Preliminary Report on Patentability issued in International Patent Application No. PCT/JP2018/032708, dated Mar. 31, 2020, English translation.
Office Action issued in China Patent Application No. 201880063249.3, dated Dec. 9, 2021 (with English translation).

* cited by examiner

[fig.1A]
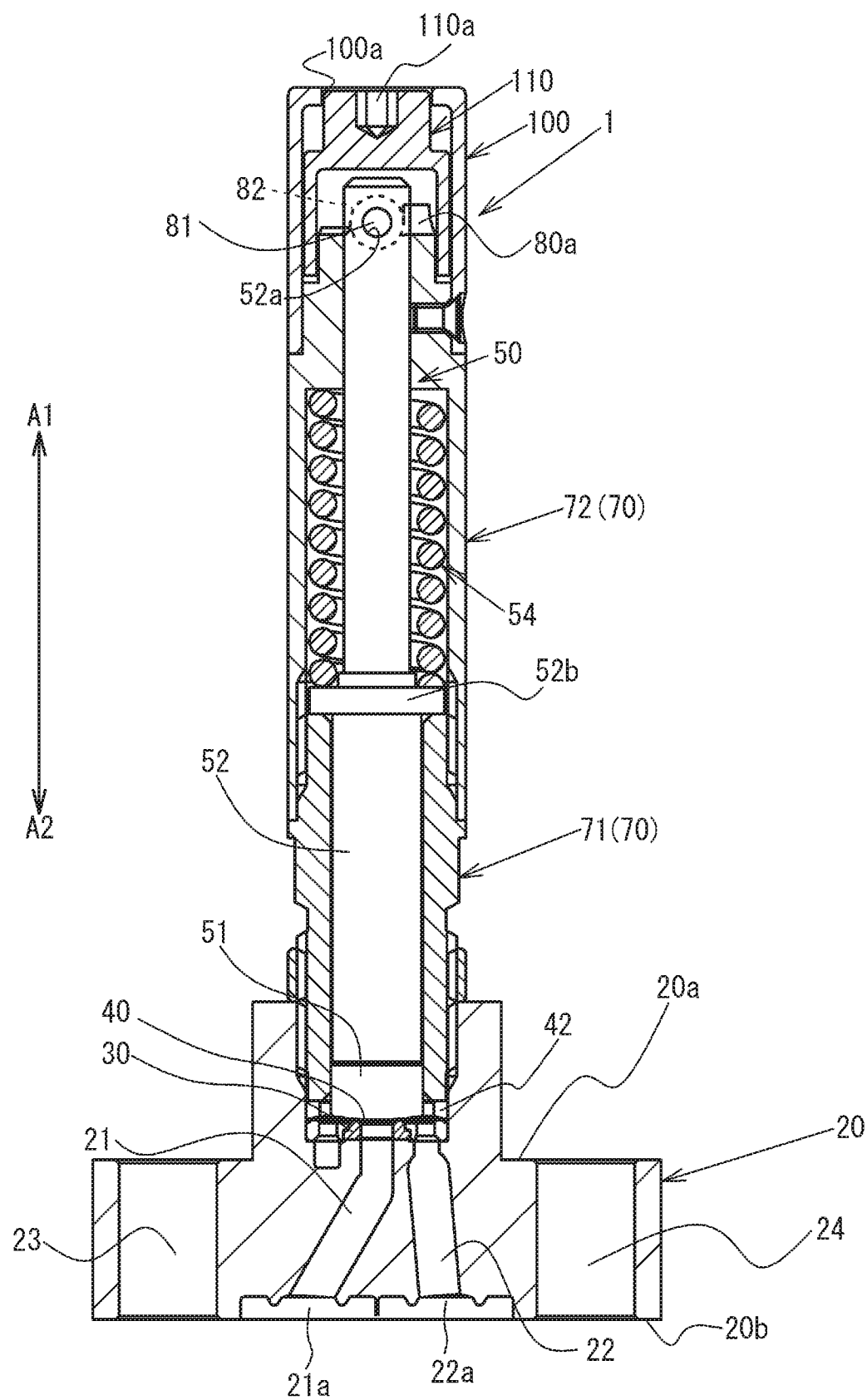

[fig.1B]
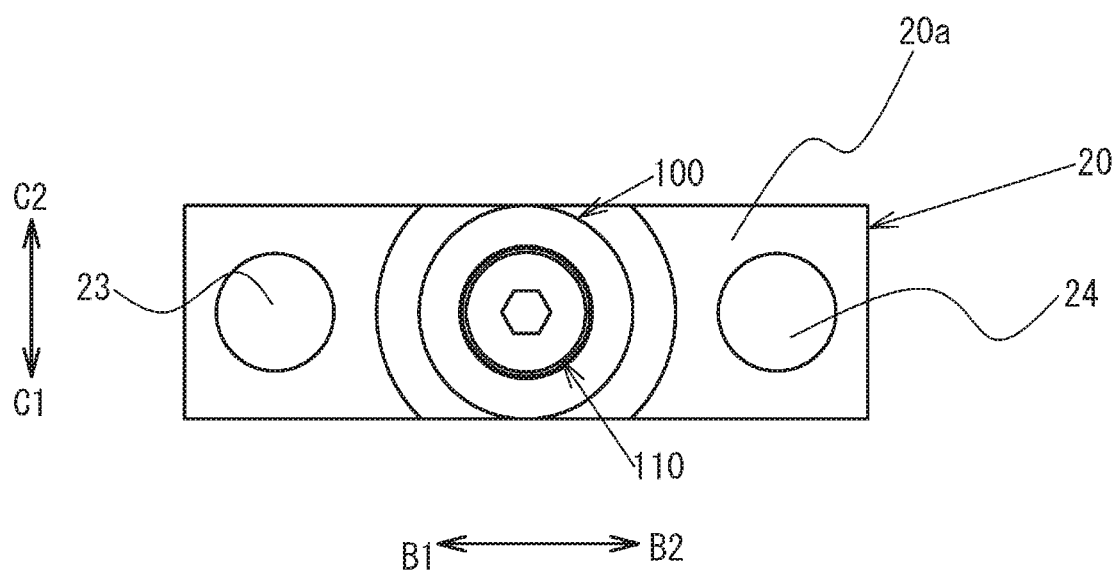

[fig.2]
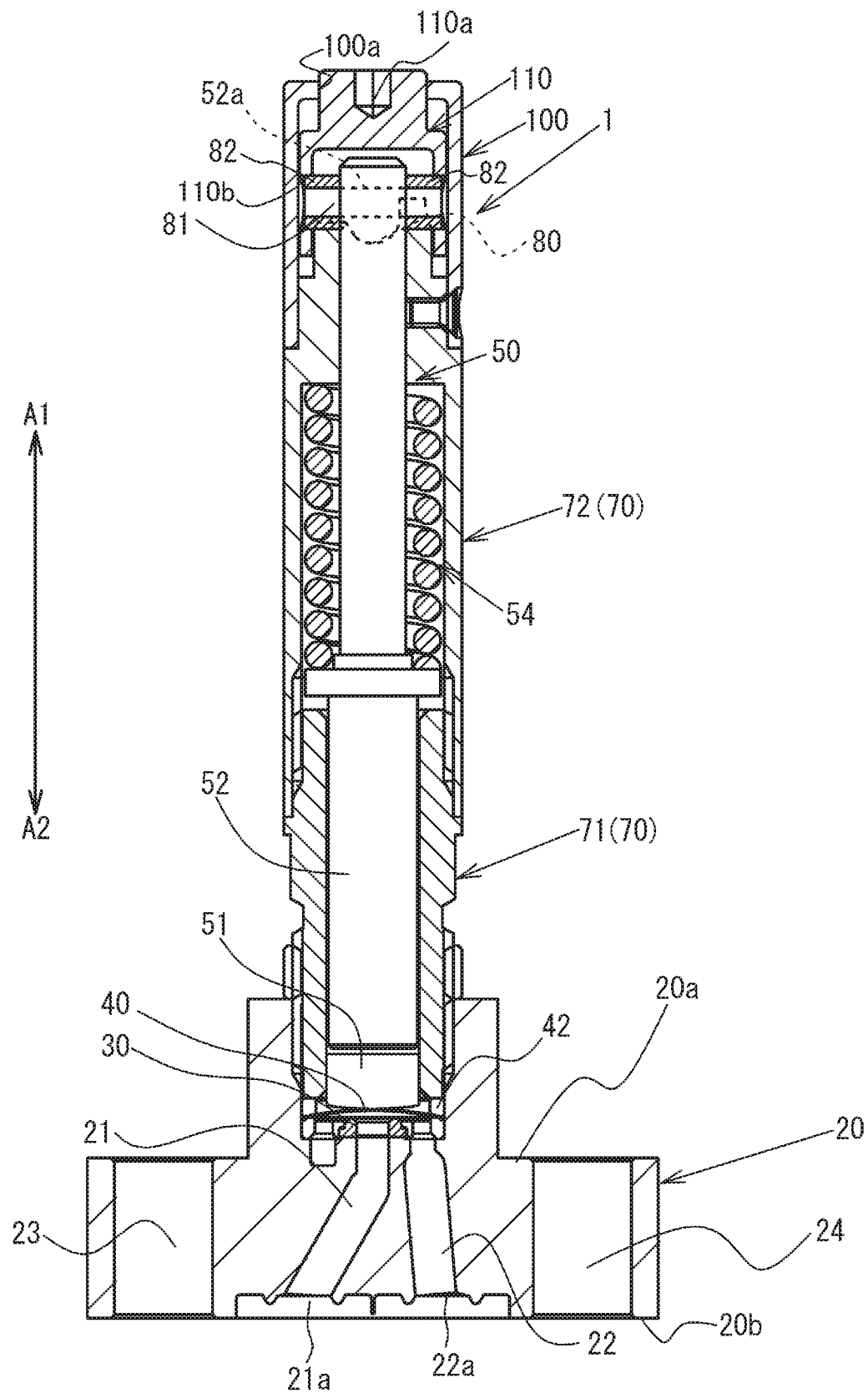

[fig.3A]
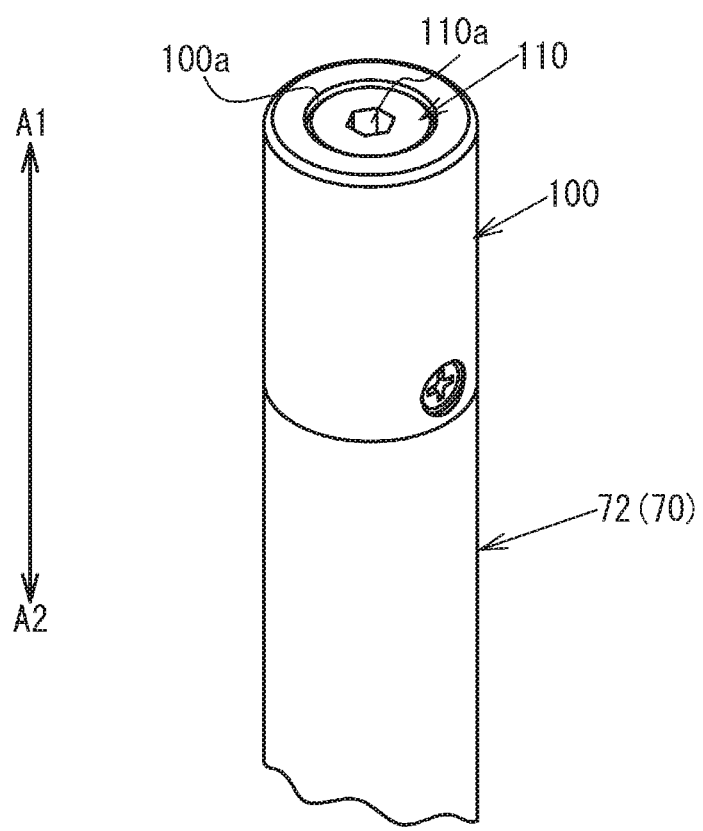

[fig.3B]
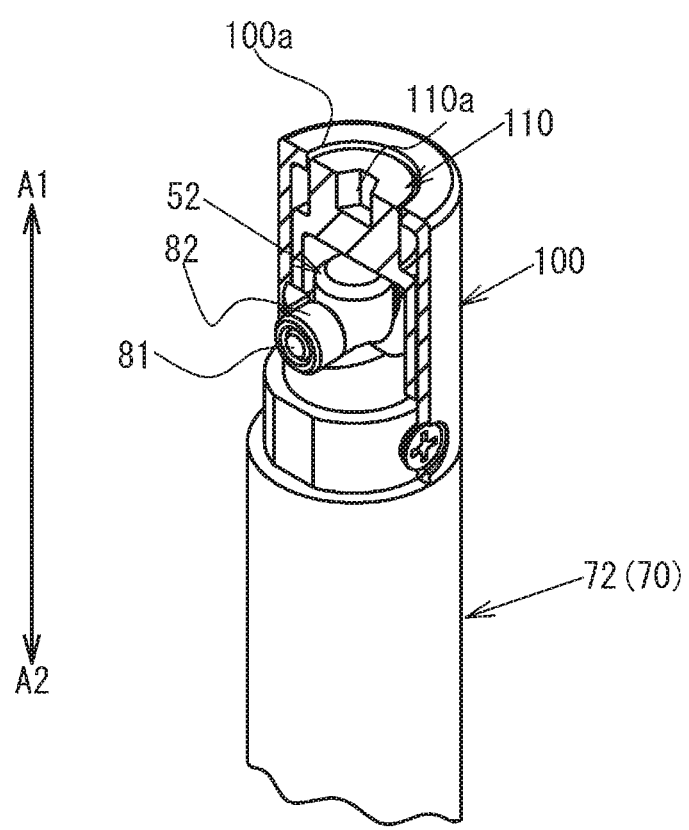

[fig.4A]
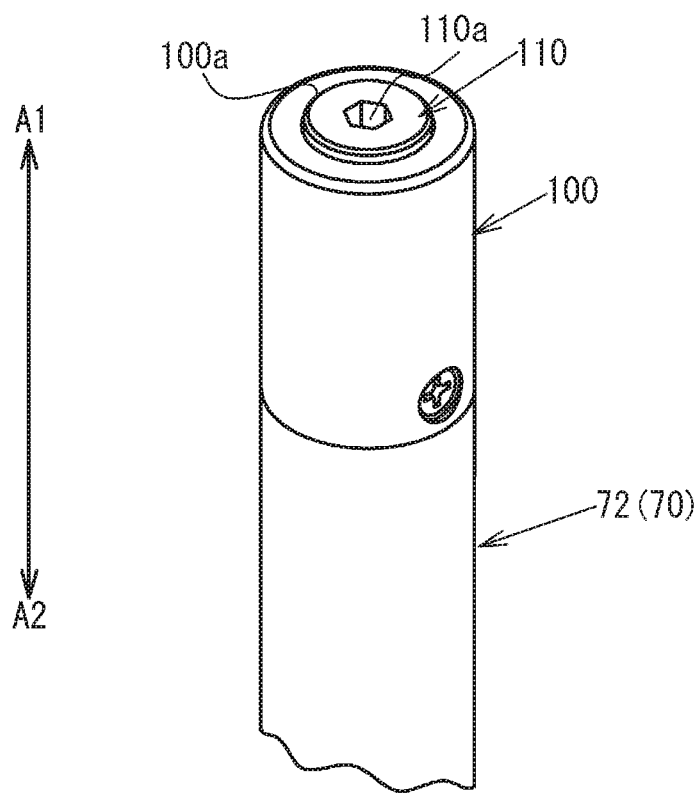

[fig.4B]
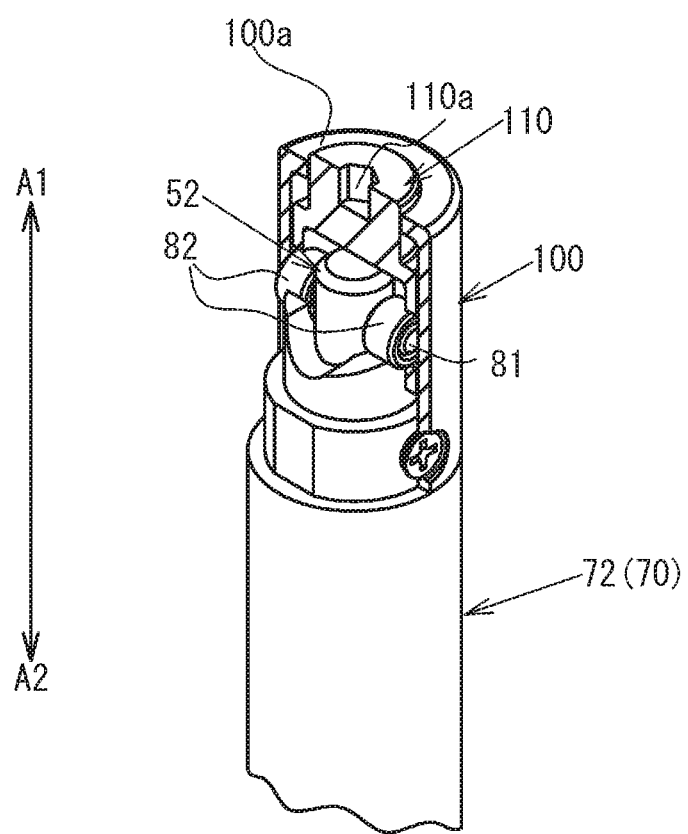

[fig.5]
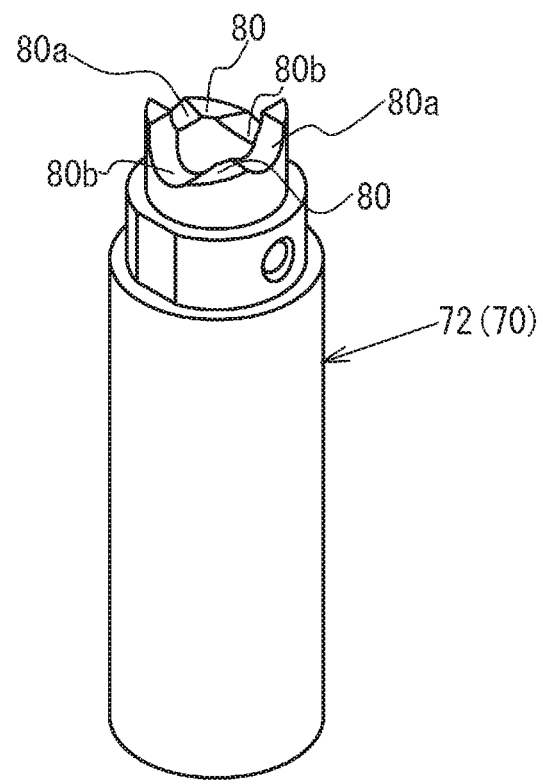
[fig.6A]
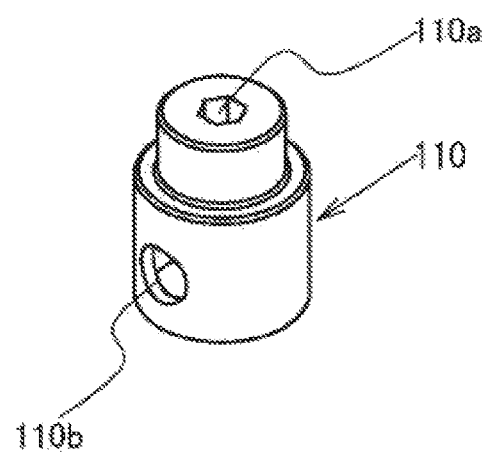

[fig.6B]
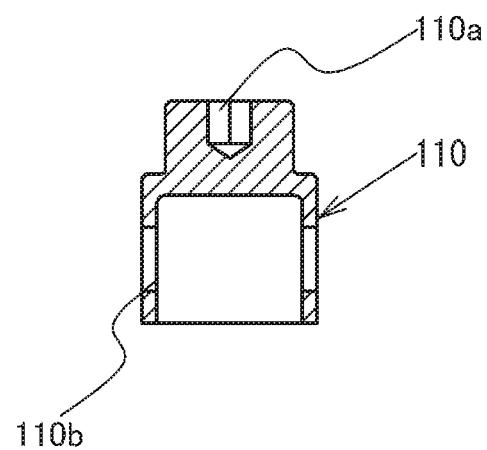
[fig.7]
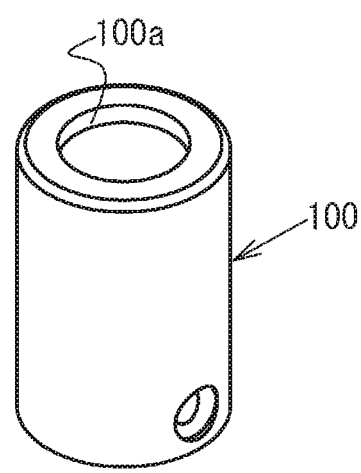

[fig.8]
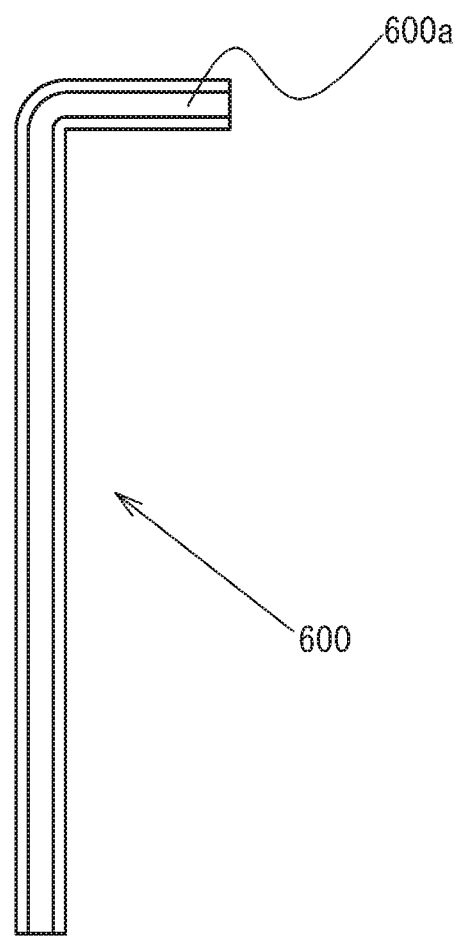

[fig.9A]
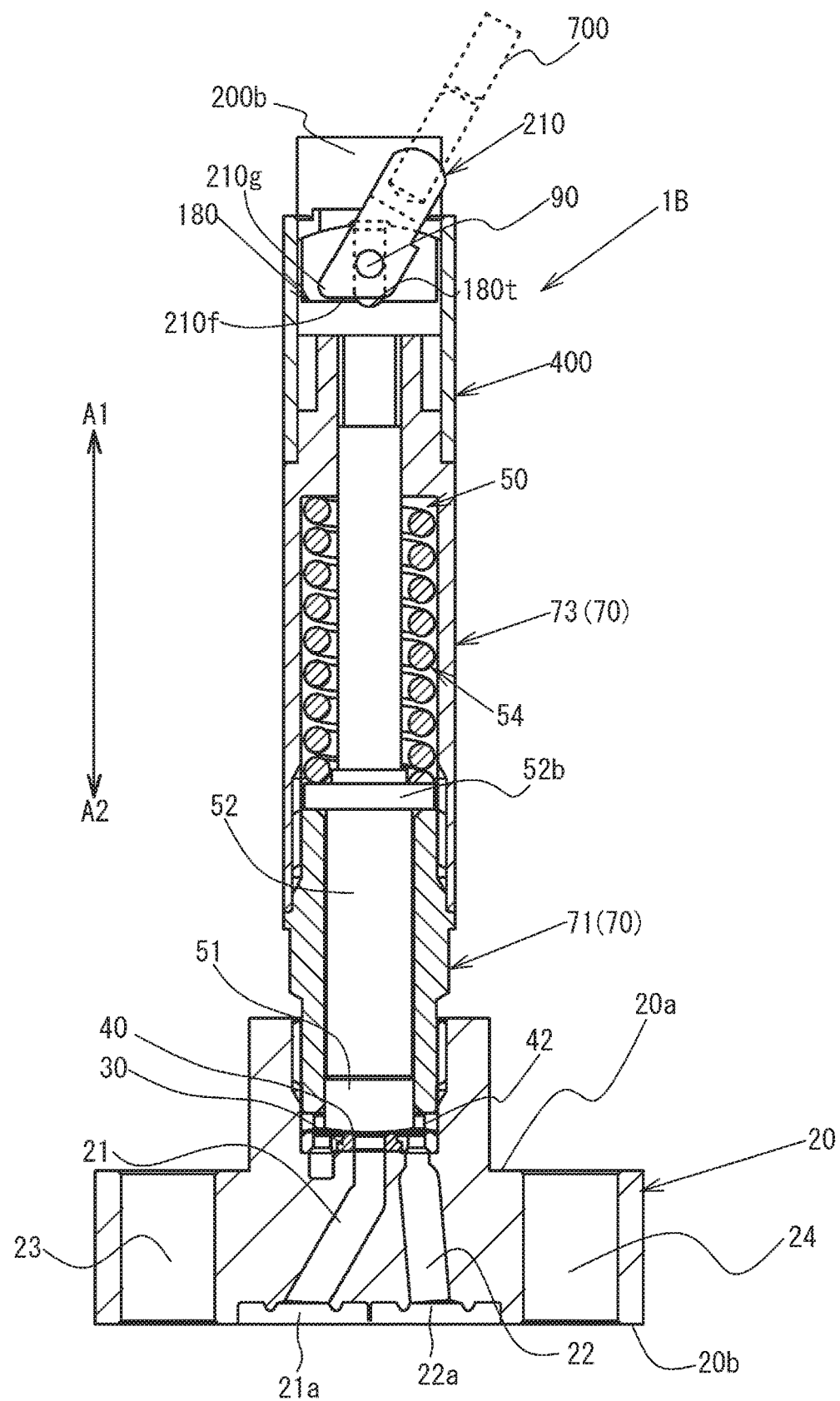

[fig.9B]
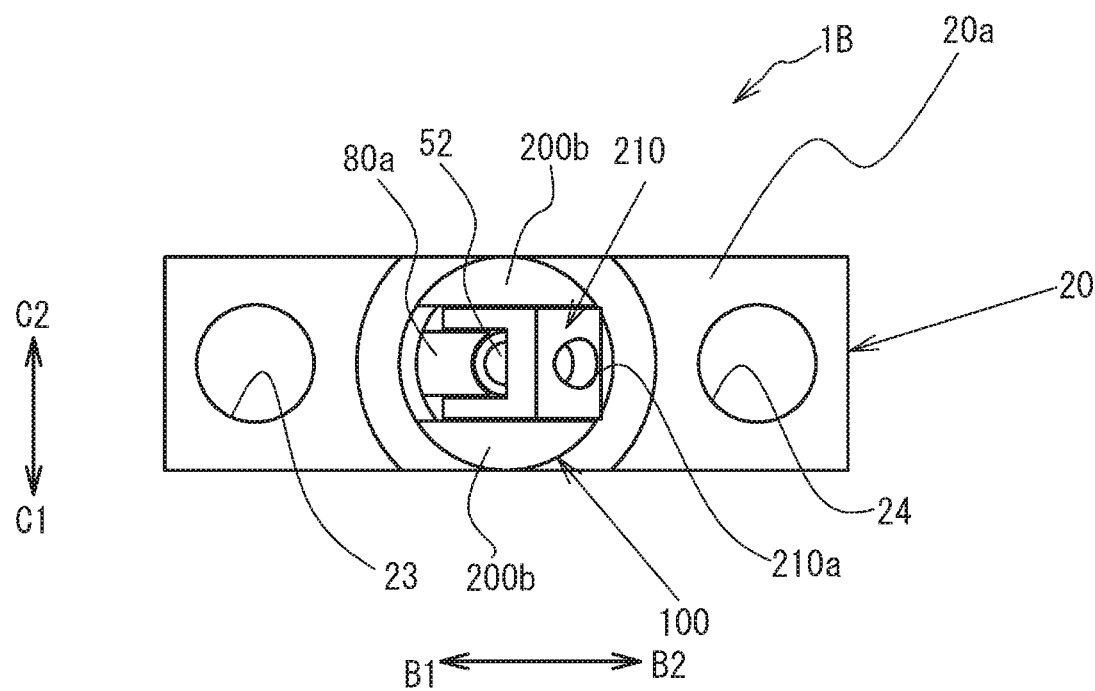

[fig.10A]
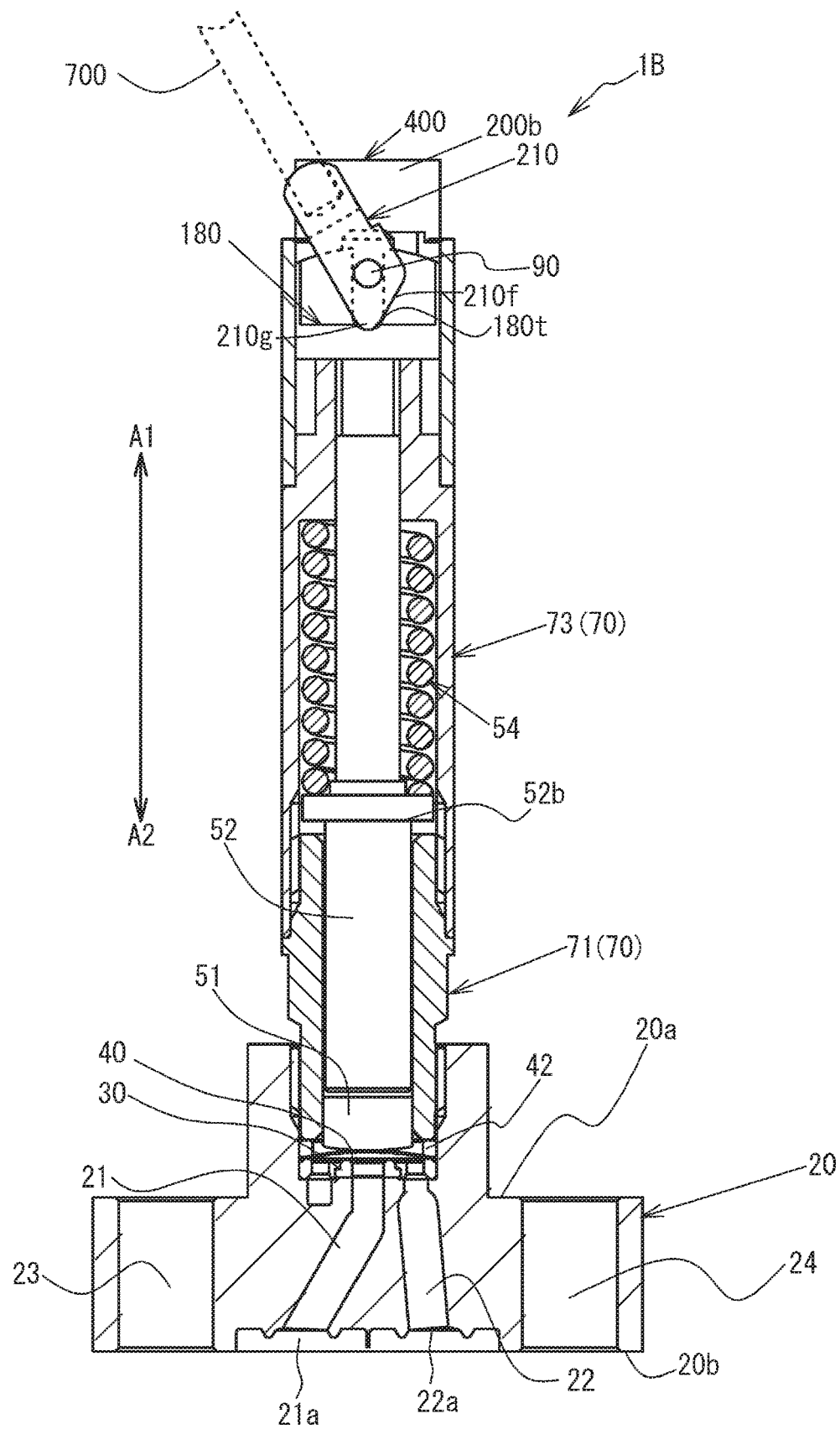

[fig.10B]
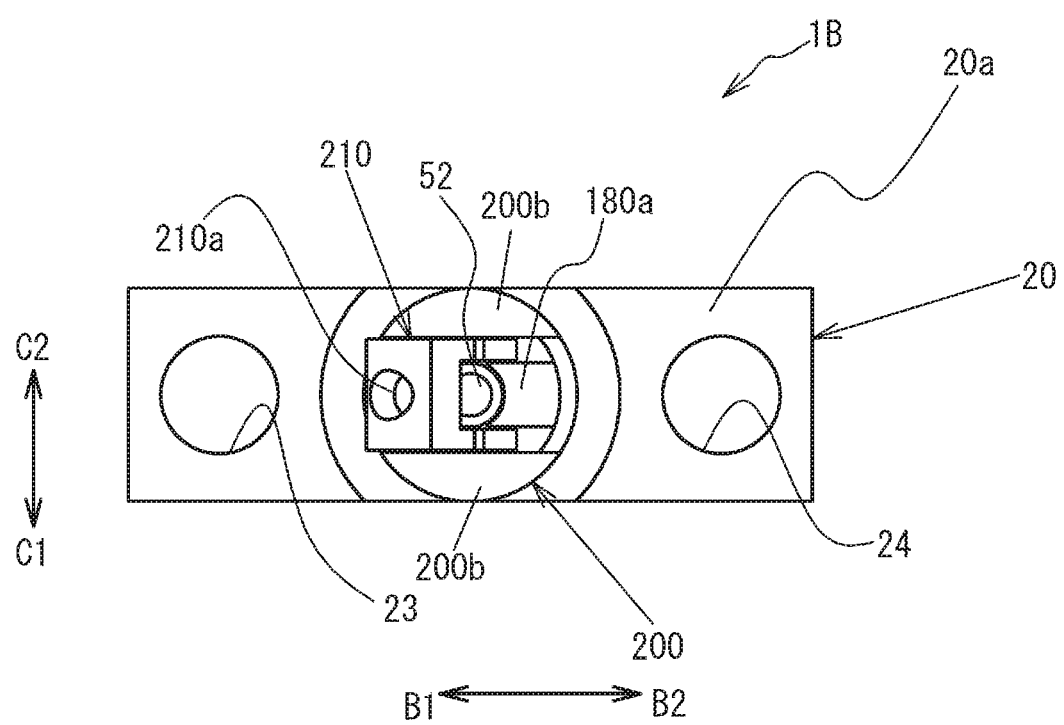

[fig.11A]
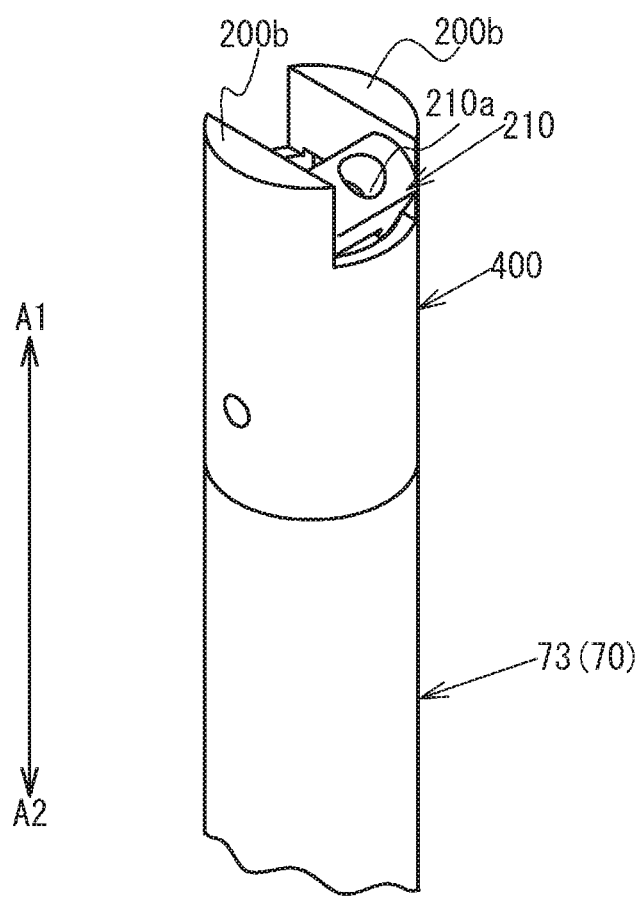

[fig.11B]
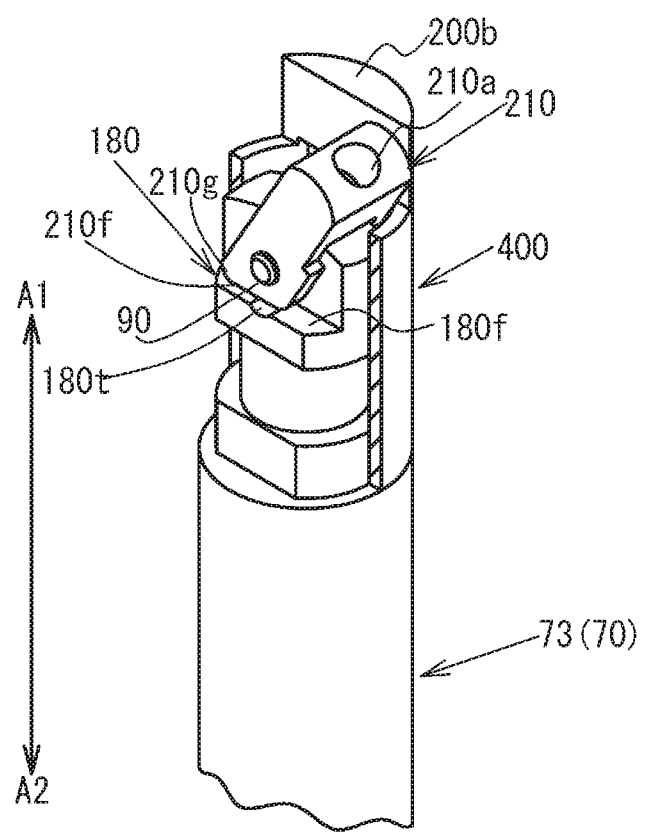

[fig.12A]
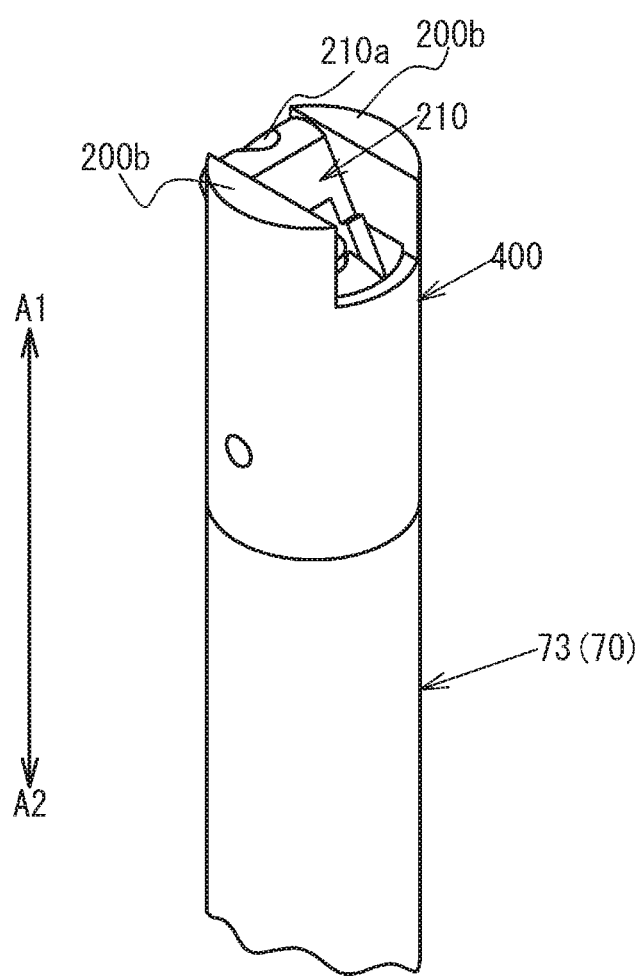

[fig.12B]
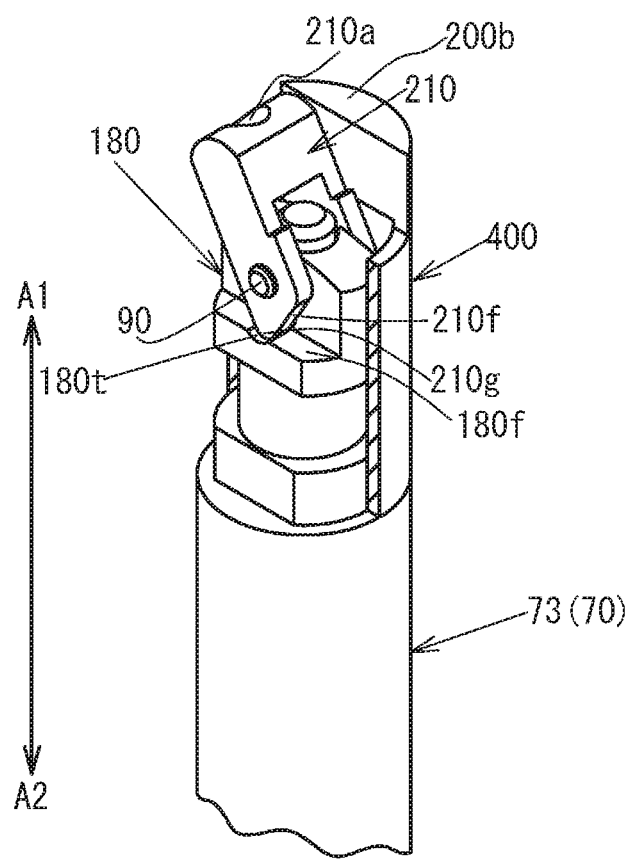

[fig.13]
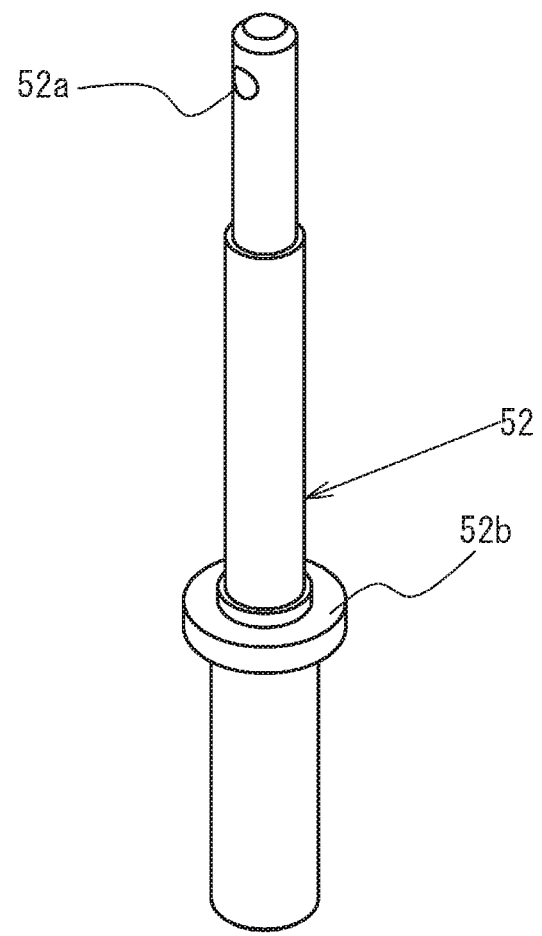

[fig.14]
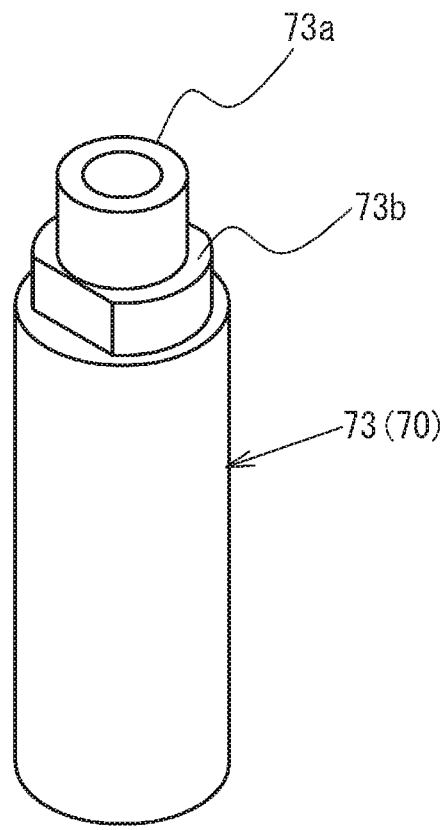
[fig.15]
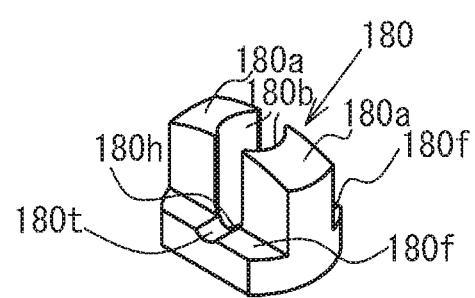

[fig.16A]
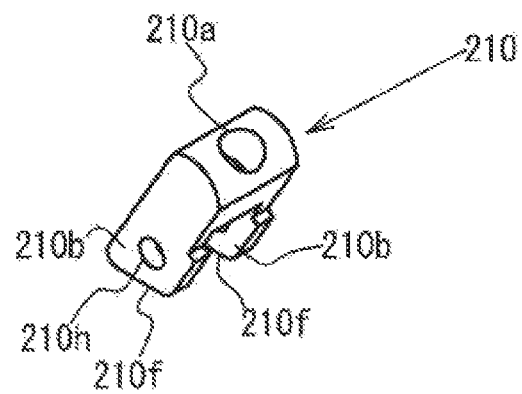
[fig.16B]
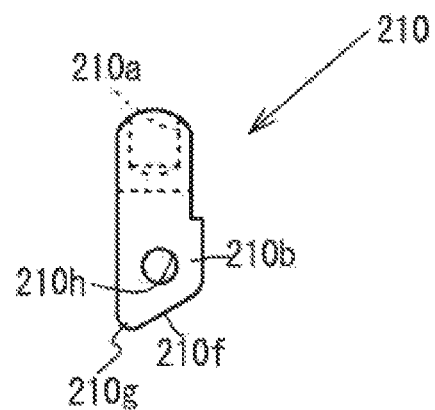

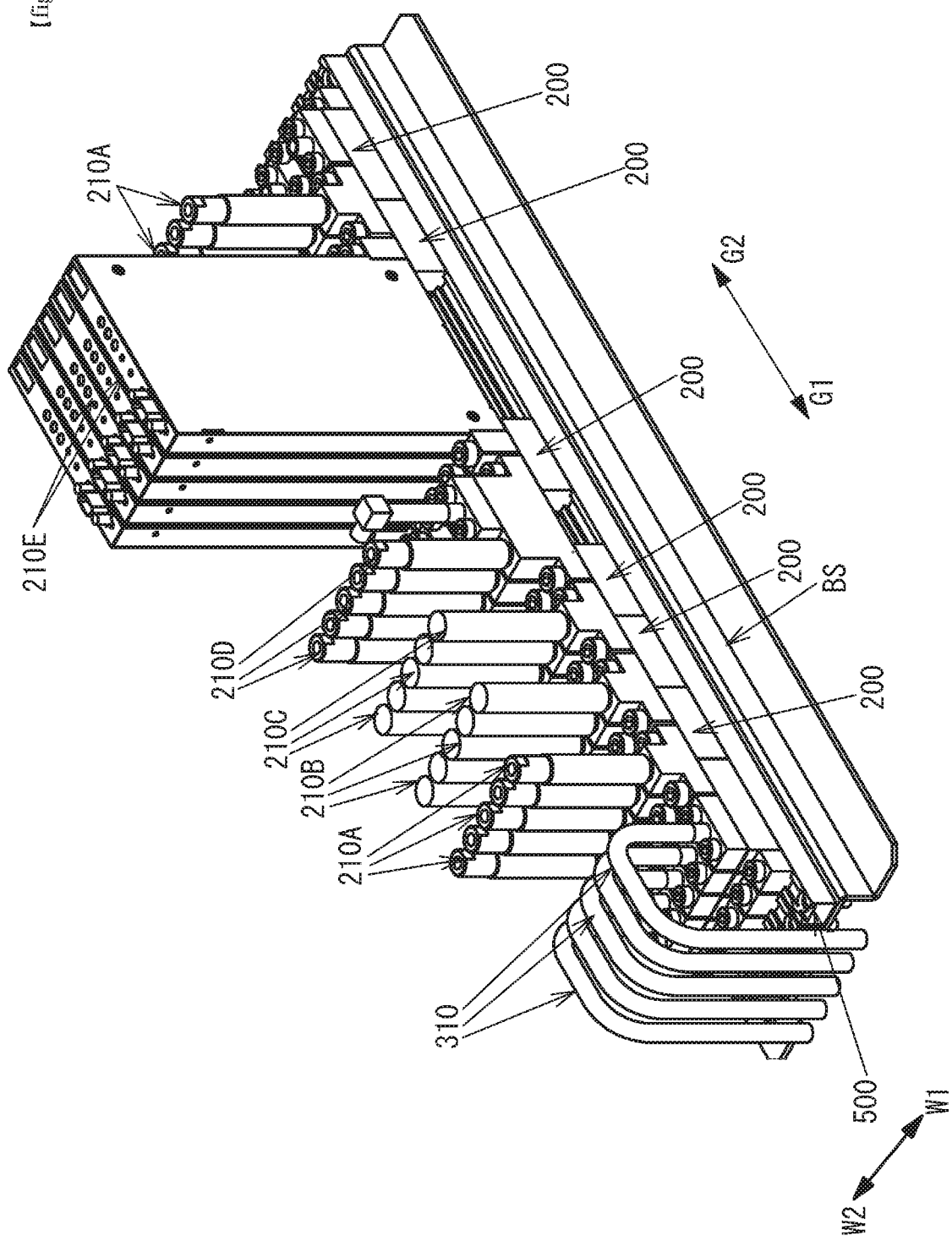

MANUAL VALVE DEVICE AND FLUID CONTROL DEVICE

FIELD OF THE INVENTION

The present invention relates to a manual valve device and a fluid control system in which fluid devices including this valve device are integrated.

DESCRIPTION OF THE BACKGROUND ART

As a fluid control system used to supply various process gases to a chamber of a semiconductor manufacturing system or the like, for example, there have been known, for example, the system disclosed in Patent Document 1 below, and the like.

In the field of a fluid control system such as described above, higher responsiveness is required to control the supply of the process gases and, to this end, advances have been made in miniaturization and integration of the fluid control system to the extent possible.

PATENT DOCUMENTS

Patent Document 1: Japanese Laid-Open Patent Application No. 2002-206700

SUMMARY OF THE INVENTION

Problems to be Solved by the Invention

Incidentally, a fluid control system such as described above includes a manual valve that is not normally used, but is used in an emergency or when fully shutting down the system. Such a manual valve includes a handle or a lever for manual operation and therefore, when these components are miniaturized in accordance with miniaturization of fluid devices such as other automatic valve devices, manual operation becomes difficult, resulting in the problem of difficulties in miniaturization.

Further, in order to prevent unintentional operation of the manual valve, it is necessary to provide a protective frame, a cap, a cover, or the like, on the handle or the lever for manual operation, and to provide an indicator indicating the opened or closed state, causing further difficulties in miniaturization.

An object of the present invention is to provide a manual valve device suitable for a miniaturized and integrated fluid control system.

Another object of the present invention is to provide a miniaturized and integrated fluid control system that includes the manual valve device described above.

Means for Solving the Problems

A manual valve device according to a first aspect of the present invention for achieving the above-described object is a manual valve device including a valve body that has a block shape, defines a bottom surface and a top surface opposing each other, and defines a fluid flow path, a valve element provided to be capable of opening and closing the flow path of the valve body, a drive mechanism that drives the valve element in an opening and closing direction, a casing that has a tubular shape, is connected to the valve body, extends upward from the top surface of the valve body, and incorporates the drive mechanism, an operation member for activating the drive mechanism, and a cam part that converts a force acting on the operation member into a driving force of the drive mechanism, and the manual valve comprises: a protective cover provided on an upper end side of the casing and covering at least a portion of the operation member, and the operation member includes an attaching part that allows removable attaching of an auxiliary tool for causing a force required for activation of the drive mechanism to act on the operation member, and the protective cover is formed so as to allow access to and operation of the attaching part of the operation member by the tool.

Preferably, a configuration can be adopted in which the operation member and the protective cover are formed so as to fall within an outer shape of the casing in a top view. More preferably, a configuration can be adopted in which the attaching part is formed into a concave shape.

Preferably, a configuration can be adopted in which the operation member is held rotatably about a central axis line of the casing, the protective cover covers an outer periphery of the operation member, and the attaching part is formed on an upper end surface of the operation member.

More preferably, a configuration can be adopted in which the drive mechanism includes a movable rod held movably in a direction that opens and closes the valve element and a roller member that is movable on a cam surface formed on the cam part and is rotatably held by the movable rod, and the cam surface includes a locking part that locks the roller member and holds the operation member in an opened position and a closed position.

Preferably, a configuration can be adopted in which the operation member is maintained with a portion of an upper end portion thereof protruding from the protective member when the flow path is opened or closed, and is maintained entirely housed in an interior of the protective member when the flow path is closed or opened from an opened state or a closed state.

Further, a manual valve device according to a second aspect of the present invention for achieving the above-described object is a manual valve device including a valve body that has a block shape, defines a bottom surface and a top surface opposing each other, and defines a fluid flow path, a valve element provided to be capable of opening and closing the flow path of the valve body, a drive mechanism that drives the valve element in an opening and closing direction, a casing that has a tubular shape, is connected to the valve body, and extends upward from the top surface of the valve body, an operation member for activating the drive mechanism, and a cam part that converts a tilting force acting on the operation member into a driving force of the drive mechanism, and comprises: a protective cover provided on an upper end side of the casing and covering at least a portion of the operation member, and the operation member includes an attaching part that allows removable attaching of an auxiliary lever for causing a tilting force required for activation of the drive mechanism to act on the operation member, and the protective cover is formed so as to allow access to the attaching part of the operation member by the auxiliary lever.

Preferably, a configuration can be adopted in which the attaching part is formed into a concave shape.

Preferably, a configuration can be adopted in which the drive mechanism includes a movable rod held movably in a direction that opens and closes the valve element and the operation member is coupled to the movable rod tiltably about a predetermined axis line, and the cam part includes a cam surface formed on the operation member, and a receiving surface that engages with the cam surface and receives a tilting force acting on the operation member.

More preferably, a configuration can be adopted in which a receiving member having the receiving surface includes a through hole that allows the movable rod to pass therethrough, and is held by the casing in the protective cover. Further, more preferably, a configuration can be adopted in which the receiving member having the receiving surface includes a through hole that allows the movable rod to pass therethrough, and is held by the casing in the protective cover.

A fluid control system of the present invention is a fluid control system comprising a plurality of fluid devices, and the fluid devices include the manual valve device having the above-described configuration.

According to the present invention, it is possible to obtain a manual valve device suitable for a miniaturized and integrated fluid control system, and reliably prevent unintentional operation of the manual valve device.

BRIEF DESCRIPTION OF THE DRAWINGS

FIG. 1A is a sectional view of a manual valve device according to an embodiment of the present invention, illustrating a valve closed state.

FIG. 1B is a top view of the manual valve device in FIG. 1A.

FIG. 2 is a sectional view of the manual valve device in FIG. 1A, illustrating a valve opened state.

FIG. 3A is an external perspective view of a main part of the manual valve device in FIG. 1A, illustrating the valve closed state.

FIG. 3B is a perspective view illustrating an internal structure of the manual valve device in FIG. 3A, partially including a cross section.

FIG. 4A is an external perspective view of the main part of the manual valve device in FIG. 2, illustrating the valve opened state.

FIG. 4B is a perspective view illustrating the internal structure of the manual valve device in FIG. 4A, partially including a cross section.

FIG. 5 is an external perspective view of a casing member.

FIG. 6A is a perspective view of an operation member.

FIG. 6B is a longitudinal sectional view of the operation member.

FIG. 7 is a perspective view of a protective cover.

FIG. 8 is a front view of a torque wrench serving as an auxiliary tool.

FIG. 9A is a sectional view of the manual valve device according to an embodiment of the present invention.

FIG. 9B is a top view of the manual valve device in FIG. 9A.

FIG. 10A is a sectional view of the manual valve device in FIG. 9A, illustrating a valve opened state.

FIG. 10B is a top view of the manual valve device in FIG. 10A.

FIG. 11A is an external perspective view of a main part of the manual valve device in FIG. 9A, illustrating the valve closed state.

FIG. 11B is a perspective view illustrating an internal structure of the manual valve device in FIG. 11A, partially including a cross section.

FIG. 12A is an external perspective view of the main part of the manual valve device in FIG. 10A, illustrating the valve opened state.

FIG. 12B is a perspective view illustrating the internal structure of the manual valve device in FIG. 12A, partially including a cross section.

FIG. 13 is an external perspective view of a movable rod.

FIG. 14 is an external perspective view of the casing member.

FIG. 15 is an external perspective view of a receiving member.

FIG. 16A is an external perspective view of the operation member.

FIG. 16B is a side view of the operation member.

FIG. 17 is a perspective view illustrating an example of a fluid control system to which the manual valve of the present invention is applied.

DESCRIPTION OF THE PREFERRED EMBODIMENTS

Embodiments of a first aspect and a second aspect of the present invention are described below with reference to the drawings.

First, an example of a fluid control system to which the present invention is applied will be described with reference to FIG. 17.

The fluid control system illustrated in FIG. 17 is provided with five rail members 500 arranged in width directions W1, W2 and extending in longitudinal directions G1, G2 on a base plate BS made of metal. It should be noted that W1, W2, G1, and G2 denote front side, back side, upstream side, and downstream side directions, respectively. In each rail member 500, various fluid devices 210A to 210E are installed via a plurality of flow path blocks 200, and the plurality of flow path blocks 200 forms flow paths (not illustrated) through which a fluid flows from the upstream side toward the downstream side.

Here, the "fluid device" is a device used in a fluid control system for controlling a flow of a fluid, and including a body defining a fluid flow path, and at least two flow path ports that open on a surface of this body. Specifically, the fluid device includes the switch valve (two-way valve) 210A, the regulator 210B, the pressure gauge 210C, the switch valve (three-way valve) 210D, the mass flow controller 210E, and the like, but is not necessarily limited thereto. It should be noted that an introducing pipe 310 is connected to each of the flow path ports of the flow path (not illustrated) described above on the upstream side.

When the fluid device is miniaturized and integrated, the fluid device is formed to have smaller width overall, as understood from FIG. 17, and gaps between the fluid devices adjacent in the width directions W1, W2 are substantially non-existent.

The manual valve device of the present invention can be applied in a position of the switch valve 210A, for example.

Embodiment 1

Next, a manual valve device according to an embodiment of the first aspect of the present invention is described with reference to FIG. 1A to FIG. 7. It should be noted that, in the drawings, arrows A1, A2 indicate upward and downward directions, A1 being the upward direction and A2 being the downward direction.

A manual valve device 1 includes a valve body 20, a diaphragm 40 serving as a valve element, a drive mechanism 50, a casing 70 incorporating the drive mechanism 50, a protective cover 100, and an operation member 110.

The valve body 20 defines a top surface 20a and a bottom surface 20b opposing each other, and flow paths 21, 22 of a gas or the like that include openings 21a, 22a on bottom surface 20b. The flow paths 21, 22 are connected with other flow path members via a seal member (not illustrated).

Through holes 23, 24 passing from the top surface 20a to the bottom surface 20b are formed in the valve body 20. These through holes 23, 24 are holes for a tightening bolt for fixing the valve body 20 on the flow path block 200 described above.

A valve seat 30 is provided around the flow path 21 of the valve body 20. The valve seat 30 is formed from a resin such as a perfluoroalkoxyalkane (PFA) or a polytetrafluoroethylene (PTFE) in an elastically deformable manner.

The diaphragm 40 functions as a valve element, has a diameter larger than the valve seat 30, and is formed in an elastically deformable manner into a spherical-shell shape by a metal such as stainless steel or an NiCo-based alloy, or a fluorine-based resin. The diaphragm 40 is pressed toward the valve body 20 by a lower end surface of a casing member 71 via a pressing adapter 42, and thereby supported by the valve body 20 so as to allow contact with and separation from the valve seat 30. In FIG. 1A, the diaphragm 40 is in a state of being pressed by a diaphragm presser 51, elastically deformed, and pressed against the valve seat 30. When the pressing by the diaphragm presser 51 is released, the diaphragm 40 is restored into a spherical-shell shape. In a state in which the diaphragm 40 is pressed against the valve seat 30, the flow path 21 is closed. When the diaphragm 40 is separated from the valve seat 30 as illustrated in FIG. 2, the flow path 21 is opened and communicates with the flow path 22.

The casing 70 is configured by casing members 71, 72 formed into a cylindrical shape and connected to each other, and is fixed to the valve body 20 by screwing a lower end portion of the casing member 71 to an upper side of the valve body 20.

The drive mechanism 50 includes the diaphragm presser 51, a movable rod 52, and a coil spring 54. The diaphragm presser 51 and the movable rod 52 are held in the casing 70 so as to be movable in the upward and downward directions A1, A2, and the movable rod 52 is restricted in movement in the downward direction A2 by a flange part 52b formed in a middle thereof coming into contact with an upper end surface of the casing member 71.

The coil spring 54 is interposed between the flange part 52b of the movable rod 52 and the casing member 72, and continually urges the movable rod 52 in the downward direction A2 by a restoring force. The manual valve device 1 is a normally-closed valve in which the flow path 21 is normally closed by the diaphragm 40.

As illustrated in FIG. 1A and FIG. 2, a pin hole 52a is formed in an upper end portion of the movable rod 52 so as to pass therethrough in a direction orthogonal to a central axis line of the movable rod 52, a pin 81 is inserted into this pin hole 52a, and a roller member 82 is fitted into both end portions of the pin 81.

As illustrated in FIG. 5, a cam surface 80 is formed on an upper end of the casing member 72, and this cam surface 80 and the roller member 82 described above constitute a cam part that converts a force acting on the operation member 110 into a driving force of the drive mechanism 50 (refer to FIG. 4B). The cam surface 80 includes a first locking part 80a capable of locking the roller member 82 and a second locking part 80b formed in a position lower than the first locking part 80a in the upward and downward directions A1, A2. The first locking part 80a and the second locking part 80b are respectively formed in two symmetrical locations, and are formed in positions 90 degrees separated from each other with respect to a central axis line of the casing member 72. That is, the manual valve device 1 is configured to open and close the flow path 21 by rotating the operation member 110 90 degrees in forward and reverse directions.

As illustrated in FIG. 6A and FIG. 6B, the operation member 110 is a cylindrical member in which an upper end portion thereof is closed, and is formed with, in symmetrical positions of the cylindrical portion, insertion holes 110b into which a portion of the roller member 82 described above is inserted. A attaching concave part 110a in which a tip end portion 600a of a torque wrench 600 serving as an auxiliary tool such as illustrated in FIG. 8 is detachably fitted is formed in a central portion on the upper end side.

As illustrated in FIG. 7, the protective cover 100 is a cylindrical member, connected to the upper end portion of the casing member 72, and fixed with a screw member. An opening 100a of the protective cover 100 on an upper end side has a diameter into which the columnar portion of the operation member 110 on the upper end side can be inserted.

Here, FIG. 1B is a top view of the manual valve device 1, where B1 and B2 in the drawing indicate longitudinal directions of the valve body 20 (flowing directions of a fluid), and C1 and C2 indicate width directions. As understood from FIG. 1B, the protective cover 100 and the operation member 110 fall within an outer shape of the casing 70 and also within an outer shape of the top surface 20a of the valve body 20. Thus, the manual valve device 1 can be applied to a fluid control system in which fluid devices are miniaturized and integrated as illustrated in FIG. 17.

As illustrated in FIG. 2, a portion of the roller member 82 held by both end portions of the pin 81 is inserted into the insertion hole 110b of the operation member 110, thereby making transmission of a force between the operation member 110 and the movable rod 52 possible. Further, the protective cover 100 is provided on an outer periphery of the operation member 110, and an inner peripheral surface of this protective cover 100 restricts the movement of the roller member 82 in an axis line direction with regards to the pin 81, keeping the roller member 82 from falling off the pin 81.

In a closed state such as illustrated in FIG. 1A, the roller member 82 is positioned at the second locking part 80b positioned on a lower side of the cam surface 80. Further, as illustrated in FIG. 3A and FIG. 3B, the operation member 110 is in a state of being entirely housed in the protective cover 100.

In order to change from this state to the opened state illustrated in FIG. 2, the torque wrench 600 is attached on the attaching concave part 110a of the operation member 110, and the operation member 110 is rotated about a central axis line of the casing 70. The roller member 82 receives a cam action of moving from the cam surface 80 to the upward direction A1 side, and the movable rod 52 moves in the upward direction A1 against the urging force of the coil spring 54. As illustrated in FIG. 4A and FIG. 4B, when the operation member 110 is rotated 90 degrees, the roller member 82 is positioned and locked by the first locking part 80a positioned on a higher side. With the movement of the roller member 82, the operation member 110 moves in the upward direction A1, as illustrated in FIG. 4A and FIG. 4B, and a portion of the upper end portion protrudes from an upper end surface of the protective cover 100.

In this way, the opened or closed state of the manual valve device 1 can be determined from the position of the operation member 110 with regards to the protective cover 100.

Embodiment 2

Next, the manual valve device according to an embodiment (Embodiment 2) of the second aspect of the present invention is described with reference to FIG. 9A to FIG. 16B. It should be noted that descriptions of structures that are the same as those of the manual valve in Embodiment 1 are omitted.

In the manual valve according to Embodiment 2, as illustrated in FIG. 13, the pin hole 52a is formed in the upper end portion of the movable rod 52 so as to pass therethrough in a direction orthogonal to a central axis line of the movable rod 52, and a pin 90 illustrated in FIG. 9A and FIG. 10A is inserted into this pin hole 52a.

Further, as illustrated in FIG. 16A and FIG. 16B, an operation member 210 is formed with a attaching concave part 210a on which a tip end of an auxiliary lever 700 having a round-bar shape and indicated by a broken line in FIGS. 9A and 10A is removably attached, and includes opposing wall parts 210b extending in parallel downward from an upper end side. Lower end surface sides of the opposing wall parts 210b are cam surfaces 210f inclined and curved, and pin holes 210h are formed perpendicular to the wall surfaces in the opposing wall parts 210b. The pin 90 described above is inserted into the two pin holes 210h.

When the upper end portion of the movable rod 52 is inserted between the two opposing wall parts 210b of the operation member 210 and the pin 90 is inserted into the pin hole 52a and the pin hole 210h, the operation member 210 is tiltably held relative to the movable rod 52 about the pin 90. It should be noted that, when a protective cover 400 formed into a cylindrical shape is inserted into and fixed to an upper end portion of a casing member 73 illustrated in FIG. 14, the pin 90 is restricted in movement by an inner peripheral surface of the protective cover 400, and is kept from falling out of the pin hole 52a and the pin hole 210h.

Further, as illustrated in FIG. 16B, a locking convex part 210g curved into a convex shape is formed on one end side of the cam surface 210f of the operation member 210, and is fitted into a locking concave part 180t of a receiving member 180 described later, making it possible to lock the movement of the operation member 210.

As illustrated in FIG. 15, the receiving member 180 includes a through hole 180h into which the upper end portion of the movable rod 52 is inserted, two protruding parts 180a formed so as to sandwich the movable rod 52, and a receiving surface 180f formed on both sides of the two protruding parts 180a and engaged with the cam surface 210f of the operation member 210. On the receiving surface 180f, the locking concave part 180t that locks a portion of the operation member 210 is formed. Opposing surfaces of the two protruding parts 180a are curved surfaces 180b curved so that the movable rod 52 can pass therethrough.

The protective cover 400 is a member having a cylindrical shape as described above, and includes protective wall parts 200b opposing each other at an upper end portion. The operation member 210 is disposed so that a most part thereof is sandwiched between the protective wall parts 200b, and the protective wall parts 200b prevent an object or the like from unexpectedly colliding with the operation member 210.

Here, FIG. 9B and FIG. 10B are top views of a manual valve device 1B, where B1 and B2 in the drawing indicate longitudinal directions of the valve body 20 (flowing directions of a fluid), and C1 and C2 indicate width directions. As understood from FIG. 9B and FIG. 10B, the protective cover 400 and the operation member 210 fall within an outer shape of the top surface 20a of the valve body 20. Thus, the manual valve device 1B can be applied to a fluid control system in which fluid devices are miniaturized and integrated as illustrated in FIG. 9A and FIG. 9B.

In a closed state such as illustrated in FIG. 9A and FIG. 11B, the cam surface 210f of the operation member 210 is separated from the receiving surface 180f of the receiving member 180. From this state, when the operation member 210 is tilted against the urging force of the coil spring 54 using the auxiliary lever 700 as illustrated in FIG. 10A and FIG. 12B, the movable rod 52 coupled to the operation member 210 moves in the upward direction A1 by the cam action of the cam surface 210f, and the valve changes to an opened state. At this time, as illustrated in FIG. 10A and FIG. 12B, the locking convex part 210g of the operation member 210 fits into the locking concave part 180t formed in the receiving member 180, thereby maintaining a posture of the operation member 210 and the valve in an opened state.

In the present embodiment, the opened or closed state of the valve can be determined based on the posture of the operation member 210. However, the ability to visually check the opened or closed state of the valve is improved by provision of indicators indicating opened and closed on a surface of the protruding part 180a of the receiving member 180.

While a case in which the cam surface of the cam part is formed on the operation member and the receiving surface is formed on the receiving member is illustrated in the above-described embodiment, it is possible to form the cam surface on the receiving member side, and the receiving surface on the operation member side.

As described above, according to the present invention, a manual valve device preferable for application to a fluid control system in which fluid devices are miniaturized and integrated can be obtained.

While a normally-closed type manual valve device is illustrated in the above-described Embodiments 1 and 2 of the present invention, the present invention is not necessarily limited thereto and can be applied to a normally-open type manual valve device as well.

DESCRIPTIONS OF REFERENCE NUMERALS 1, 1B Manual valve device
20 Valve body
20a Top surface
20b Bottom surface
21 Flow path
21a Opening
22 Flow path
22a Opening
23, 24 Through hole
30 Valve seat
40 Diaphragm
42 Pressing adapter
50 Drive mechanism
51 Diaphragm presser
52 Movable rod
52a Pin hole
52b Flange part
54 Coil spring
70 Casing
71, 72, 73 Casing member
80 Cam surface
80a First locking part
80b Second locking part
81 Pin
82 Roller member
90 Pin
100 Protective cover 100a Opening
110 Operation member
110a Attaching concave part
110b Insertion hole
180 Receiving member
180a Protruding part
180b Curved surface
180f Receiving surface
180h Through hole
180t Locking concave part
200 Flow path block
200b Protective wall part
210 Operation member
210A Switch valve
210B Regulator
210C Pressure gauge
210D Fluid device
210E Mass flow controller
210a Attaching concave part
210b Opposing wall part
210f Cam surface
210g Locking convex part
210h Pin hole
310 Introducing pipe
400 Protective cover
500 Rail member
600 Torque wrench
600a Tip end portion
700 Auxiliary lever
A1 Upward direction
A2 Downward direction
BS Base plate
G1 Longitudinal direction
G2 Longitudinal direction
W1 Width direction
W2 Width direction

What is claimed is:

1. A manual valve device comprising:
a valve body that has a block shape, defines a bottom surface and a top surface opposing each other, and defines a fluid flow path,
a valve element that includes a diaphragm and that is configured to open and close the fluid flow path of the valve body,
a drive mechanism that drives the valve element in an opening and closing direction,
a casing that has a tubular shape, is connected to the valve body, extends upward from the top surface of the valve body, and the casing houses the drive mechanism,
an operator structure to activate the drive mechanism, and
a cam part that converts a force acting on the operator structure into a driving force of the drive mechanism,
the manual valve device further comprising:
a protective cover provided on an upper end side of the casing and covering at least a portion of the operator structure,
the operator structure including an attachment part that allows removable attaching of an auxiliary tool to cause a force required for activation of the drive mechanism to act on the operator structure, and
the protective cover being formed so as to allow access to the attachment part of the operator structure by the auxiliary tool,
wherein the drive mechanism comprises a movable rod with an upper end connected to the operator structure and a lower end to press the diaphragm; and a coil spring to urge the movable rod toward the diaphragm,
the movable rod comprises an upper portion around which the coil spring is fitted, a flange portion which receives an urging force of the coil spring, and a lower portion around which no coil spring is fitted, and
the casing comprises a lower casing member connected to the valve body and accommodating the lower portion of the movable rod, and an upper casing member connected coaxially to an upper end of the lower casing member and accommodating the flange portion of the movable rod, the upper portion of the movable rod, and the coil spring.

2. The manual valve device according to claim 1, wherein the operator structure and the protective cover are formed so as to fall within an outer shape of the casing in a top view.

3. The manual valve device according to claim 2, wherein the operator structure is held rotatably about a central axis line of the casing,
the protective cover covers an outer periphery of the operator structure, and
the attachment part is formed on an upper end surface of the operator structure.

4. The manual valve device according to claim 3, wherein the drive mechanism includes the movable rod held movably in a direction that opens and closes the valve element and a roller member that is movable on a cam surface formed on the cam part and is rotatably held by the movable rod,
the cam surface including a locking part that locks the roller member and holds the operator structure in an opened position and a closed position.

5. The manual valve device according to claim 3, wherein the operator structure is maintained with an upper end portion thereof entirely housed in an interior of the protective cover when the fluid flow path is closed, and with a portion thereof protruding from the protective cover when the fluid flow path is opened from a closed state.

6. The manual valve device according to claim 1, wherein the attachment part is formed into a concave shape.

7. A fluid control system comprising:
a plurality of fluid devices,
the fluid devices including the manual valve device described in claim 1.

8. The manual valve device according to claim 1, wherein the cam part includes a cam surface, and the cam surface is formed on an upper end of the upper casing member.

9. A manual valve device comprising:
a valve body that has a block shape, defines a bottom surface and a top surface opposing each other, and defines a fluid flow path,
a valve element that includes a diaphragm and that is configured to open and close the fluid flow path of the valve body,
a drive mechanism that drives the valve element in an opening and closing direction,
a casing that has a tubular shape, is connected to the valve body, and extends upward from the top surface of the valve body,
an operator structure to activate the drive mechanism, and
a cam part that converts a tilting force acting on the operator structure into a driving force of the drive mechanism, the manual valve device further comprising:
a protective cover provided on an upper end side of the casing and covering at least a portion of the operator structure,
the operator structure including an attachment part that allows removable attaching of an auxiliary lever to cause a tilting force required for activation of the drive mechanism to act on the operator structure, and
the protective cover being formed so as to allow access to the attachment part of the operator structure by the auxiliary lever,
wherein the drive mechanism comprises a movable rod with an upper end connected to the operator structure and a lower end to press the diaphragm; and a coil spring to urge the movable rod toward the diaphragm,
the movable rod comprises an upper portion around which the coil spring is fitted, a flange portion which receives an urging force of the coil spring, and a lower portion around which no coil spring is fitted, and
the casing comprises a lower casing member connected to the valve body and accommodating the lower portion of the movable rod, and an upper casing member connected coaxially to an upper end of the lower casing member and accommodating the flange portion of the movable rod, the upper portion of the movable rod, and the coil spring.

10. The manual valve device according to claim 9, wherein
the attachment part is formed into a concave shape.

11. The manual valve device according to claim 9, wherein
the drive mechanism includes the movable rod held movably in a direction that opens and closes the valve element, the operator structure is coupled to the movable rod tiltably about a predetermined axis line, and the cam part includes a cam surface formed on the operator structure, and a receiving surface that engages with the cam surface and receives a tilting force acting on the operator structure.

12. The manual valve device according to claim 11, wherein
a receiver structure of the receiving surface includes a through hole that allows the movable rod to pass therethrough, and is held by the casing in the protective cover.

13. The manual valve device according to claim 12, wherein
the receiver structure further includes a locking part to engage with a portion of the operator structure and maintain the operator structure in an opened state or a closed state.

* * * * *